United States Patent [19]

Lambright et al.

[11] Patent Number: 6,015,348

[45] Date of Patent: Jan. 18, 2000

[54] SCALABLE GAME SERVER ARCHITECTURE

[75] Inventors: Patrick B. Lambright, Redmond; David M. Gedye, Seattle, both of Wash.

[73] Assignee: Starwave Corporation, Bellevue, Wash.

[21] Appl. No.: 08/733,578

[22] Filed: Oct. 18, 1996

[51] Int. Cl.[7] .................................................. A63F 9/22
[52] U.S. Cl. ........................................... 463/42; 463/29
[58] Field of Search ................... 463/40–42, 15, 463/17–20; 395/200.31, 200.32, 200.47; 364/411.1, 410.1

[56] References Cited

U.S. PATENT DOCUMENTS

| | | | |
|---|---|---|---|
| 5,051,822 | 9/1991 | Rhoades | 358/86 |
| 5,083,800 | 1/1992 | Lockton | 273/439 |
| 5,558,339 | 9/1996 | Perlman | 463/42 |
| 5,586,257 | 12/1996 | Perlman | 463/42 |
| 5,627,766 | 5/1997 | Beaven | 364/551.01 |
| 5,634,848 | 6/1997 | Tsuda et al. | 463/25 |
| 5,664,778 | 9/1997 | Kikuchi et al. | 463/40 |
| 5,668,950 | 9/1997 | Kikuchi et al. | 463/41 |
| 5,684,955 | 11/1997 | Meyer et al. | 395/200.31 |
| 5,762,552 | 6/1998 | Vuong et al. | 463/25 |
| 5,774,660 | 6/1998 | Brendel et al. | 395/200.31 |
| 5,791,991 | 8/1998 | Small | 463/41 |
| 5,805,814 | 9/1998 | Tsuda et al. | 395/200.33 |

*Primary Examiner*—Jessica J. Harrison
*Assistant Examiner*—John M. Hotaling, II
*Attorney, Agent, or Firm*—David E. Lovejoy

[57] ABSTRACT

A scalable game apparatus and method for implementing a multi-player computer game includes a plurality of networked computers over which computer processes are distributed. In various embodiments, each computer includes a baron process which coordinates the spawning of a sector manager process on the computer and communicates with a primary server process on one of the networked computers. The primary server process determines on the basis of computer loading which computer in the network should be used to spawn a new sector manager. Each sector manager implements a logical area into which game players can enter and perform game-related activities. Each baron process provides computer loading information to the primary server process. The inventive method and apparatus allows a large number of players to be efficiently accommodated while improving the reliability of the game.

23 Claims, 5 Drawing Sheets

(PRIOR ART)
FIG. —1

SCALABLE GAME SERVER ARCHITECTURE

BACKGROUND OF THE INVENTION

1. Technical Field

This invention relates generally to a computer hardware and software architecture which supports interactive multi-player computer games. More particularly, the invention provides a scalable system which efficiently distributes computer program components constituting a game across multiple computers.

2. Related Information

Interactive multi-player computer games such as a DOOM game, a QUAKE game, a DUKE NUKEM game, and others are well known. (DOOM and QUAKE are registered trademarks of Id Software, Inc., and DUKE NUKEM is a trademark of Apogee Software, Ltd.) In such games, players can navigate through various "rooms" requiring player interaction in the form of uncovering clues, answering questions, and making selections. In certain versions of these games, each player is provided with a dedicated personal computer which interacts with a central computer over the Internet or other communications medium. New players can enter a game already in progress, while others can exit at their choosing.

As one example, a game might provide a "submarine" room which can hold a limited number of people at a time, wherein each player controls certain activities in the room. Based on the skills of each player, the submarine can be made to move toward various destinations and, upon successful arrival at a particular location, one or more players can move from the submarine into a different room. The players can play the game from different geographic locations and yet, because of coordination in a central computer program, each player is made aware of the actions of the other players. When a new player attempts to enter a room which has reached its capacity limit, a new copy of the room can be created to allow additional players to participate.

FIG. 1 shows a conventional arrangement of hardware and software components for implementing an interactive game as described above. Each of three game players (PLAYER #1, PLAYER #2, and PLAYER #3) is provided with a corresponding computer 101, 102 and 103, each of which is coupled to Internet service provider such as an AMERICA ONLINE service provider or a COMPUSERVE service provider through respective servers 104 and 105. (AMERICA ONLINE and COMPUSERVE are registered trademarks of America Online, Inc., and Compuserve Inc., respectively.) Player actions and displayable information can be transmitted over the Internet 106 to a game server 107 which coordinates the game. While the Internet 106 is depicted as a bus in FIG. 1 for the purposes of discussion, it will be appreciated that the Internet actually comprises a collection of interconnected computer networks.

Typically, each player's computer executes a client game component (101a through 103a) which communicates with a server game component 107a executing on game server 107 to implement the game. Each client game component such as element 101a translates player actions into game commands which are transmitted to server game component 107a, which in turn changes various aspects of the game and returns information to each client game component which displays the updated game information to the player.

Several problems exist with the conventional arrangement depicted in FIG. 1. For one, it is not uncommon for a very large number of game players (hundreds or thousands) to simultaneously play one game. When a large number of players participate in a game, game server 107 may become bogged down, thus slowing down the game for all players. Moreover, if a hardware or software problem develops in game server 107, the disruption caused by stopping the game can inconvenience a very large number of players. Thus, the conventional multi-player game architecture shown in FIG. 1 is not well suited for a large number of players. Due to the increasing popularity of interactive computer games, this problem has become more widespread. Accordingly, a need exists to provide a more efficient and reliable interactive computer game architecture.

SUMMARY OF THE INVENTION

The present invention overcomes the aforementioned problems by providing a scalable, distributed game architecture which automatically allocates game computing tasks across different machines as new players enter rooms constituting a game. Various embodiments of the inventive system and method provide a plurality of networked computers each including a "baron" software process which oversees the scheduling and coordination of rooms ("sectors") on the computer. As new players enter sectors constituting the game and thus cause additional sectors to be created, a primary process on one of the computers communicates with the barons to determine where the new sector should be located and, based on the determination, one of the barons creates a new software process (a "sector manager") on one of the selected computers.

In various embodiments, each baron monitors various performance indicia such as CPU utilization rates and communicates this information back to the primary process for use in determining where to locate new sector managers. Other features and advantages of the invention will become apparent with reference to the following detailed description and the figures.

DETAILED DESCRIPTION OF THE PREFERRED EMBODIMENTS

Figure 2:
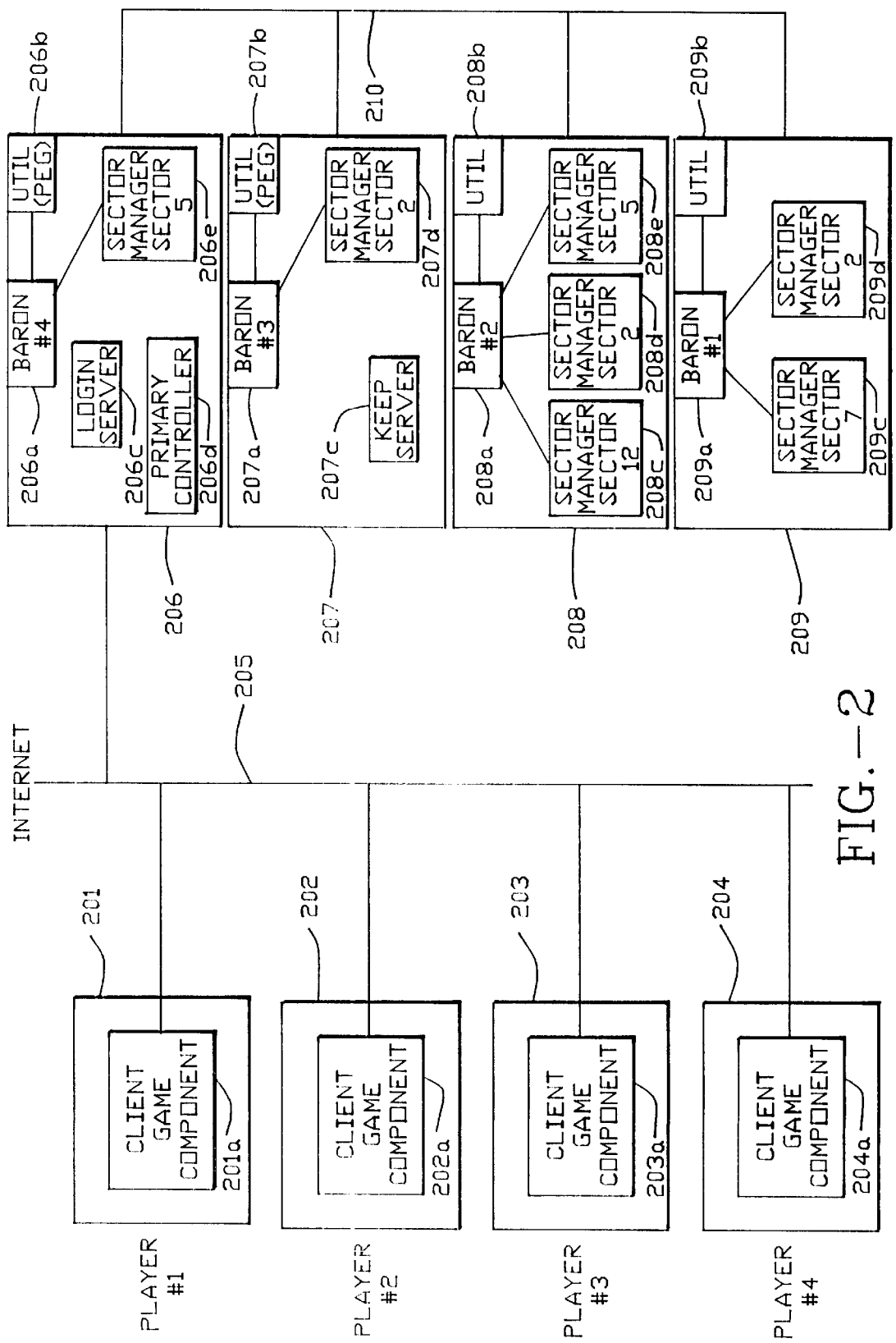
FIG. 2 shows a distributed game server system and method employing various principles of the present invention.

Reference will now be made to FIG. 2 which shows in block diagram form a system employing the principles of the present invention. As shown in FIG. 2, a plurality of game players (PLAYER #1 through PLAYER #4) each is provided with a computer (elements 201 through 204) which may be situated at geographically diverse locations. Each of these computers may comprise any of a variety of well known so-called "personal" computers including a CPU, memory, input devices and a display, and can be coupled to Internet 205 through a suitable modem and appropriate Internet service provider (800*a*–800*d*). Examples of such computers include IBM-compatible personal computers such as the Intel Pentium-based Dell Dimension series of computers from Dell Corporation of Austin, Tex.

Furthermore, each computer executes a client game component (elements 201*a* through 204*a*) which communicates via Internet 205 with a game server computer 206. Each client game component may be obtained by, for example, downloading computer software via the Internet or by retrieving the game component from a CD-ROM or other storage media. This allows multiple players to interact with a common computer game using a client-server architecture.

Figure 1:
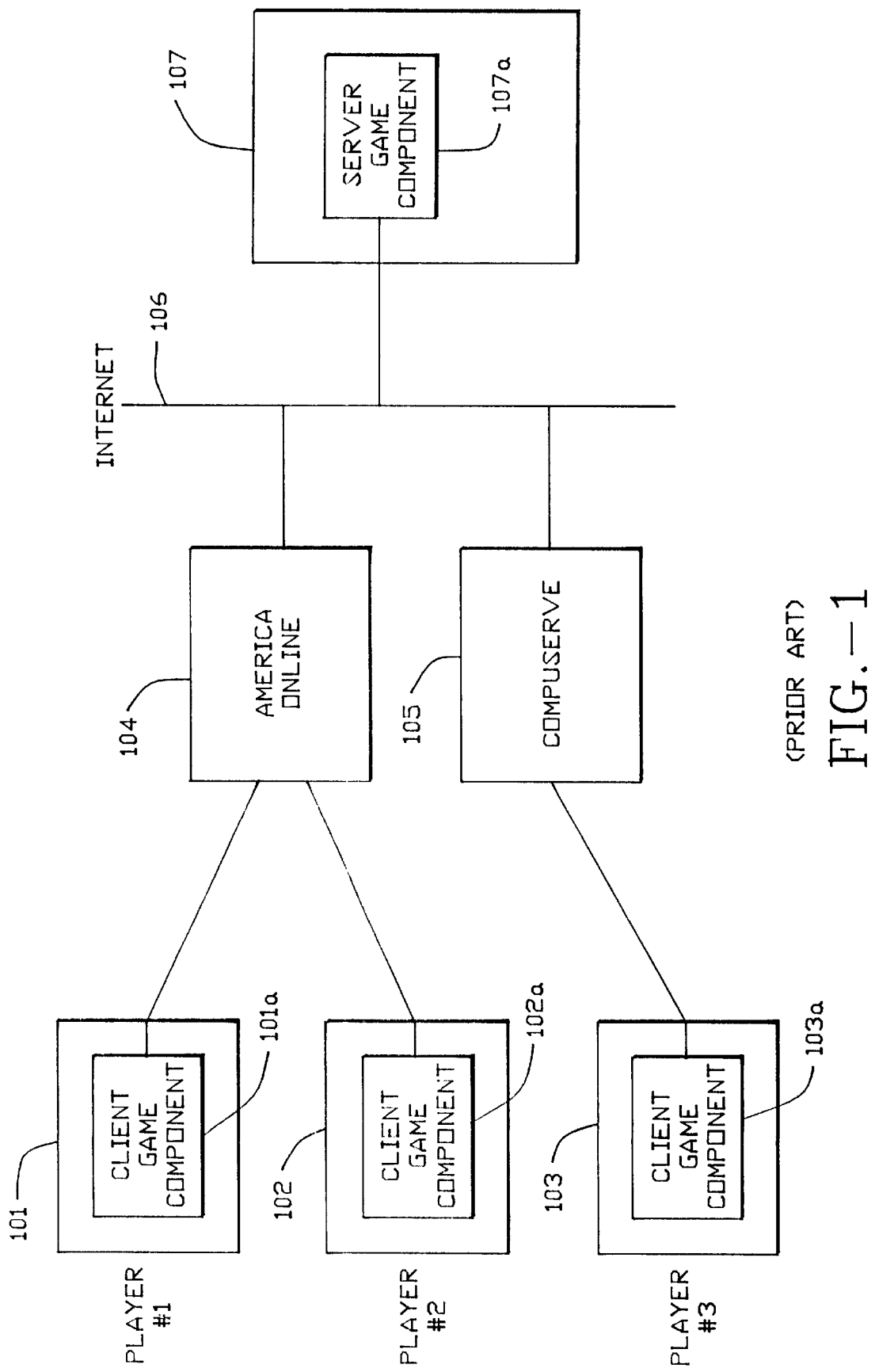
FIG. 1 shows a conventional interactive computer game architecture which allows geographically diverse players to play a common computer game.

In contrast to the approach shown in FIG. 1, various embodiments of the present invention include a plurality of computer servers 206 through 209 which are coupled via a network 210 to implement the common computer game. Each computer server can, for example, comprise an Intel-based microprocessor executing the Windows NT™ operating system (from Microsoft Corporation of Redmond, Wash.) and including suitable memory and a local area network connection such as Ethernet. Well known communication protocols such as TCP/IP can be used for communication among the networked computers. Any of various computer languages such as C++ may be used to implement the inventive functions.

As shown in FIG. 2, the computer game is constituted by a plurality of sector managers such as sector manager 207*d* in computer 207. Each sector manager implements a logical area into which players can enter and perform game-related activities. In contrast to conventional approaches, each sector is preferably implemented as a separately schedulable process or task which can be allocated across different physical machines to balance the load among different physical computers and to prevent a single point of failure. Each sector manager can be created and/or scheduled by a corresponding "baron" process such as baron process 207*a* on computer 207. Each process may communicate via a conventional e-mail protocol, for example.

As shown by way of example in FIG. 2, sector manager 207*d* implements a "sector 2" game component, which services players who wish to enter sector 2 and interact with other players in that sector. Sector 2 may constitute, for example, the aforementioned "submarine room" into which a certain number of players may reside and interact. For the purposes of explanation, sectors are identified by number rather than name, although from the player's perspective each sector would desirably be identified by a suitable game nomenclature such as "the submarine room".

Significantly, another copy of the sector 2 component (element 209*d* in computer 209) can be simultaneously executed in a different computer with different players. For example, if sector 2 (as implemented in the computer game) supports a maximum of ten players in the sector and ten players have already entered sector 2, then when an eleventh player attempts to enter sector 2, another copy of sector 2 can be scheduled—preferably on a computer other than computer 207, such as computer 209—and the eleventh player will enter the newly scheduled copy of sector 2. Thus, although the new player will be able to perform the game-related activities pertinent to that type of room, the new player will be alone in the new copy of the room until another player chooses to or is able to enter that new copy of the room.

In various embodiments, one of the plurality of networked computers includes a login server process 206*c* and a primary controller process 206*d* (see computer 206). Login server process 206*c* coordinates the logging on of new players to the system, and primary controller process 206*d* coordinates the allocation of players to sectors and the creation of new sector copies as needed. Moreover, a "keep server" process 207*c* resides in various embodiments on a separate computer 207 to maintain player state information across game sessions, such as activity logs and sector transitions.

As explained above, the scheduling and execution of each sector manager preferably occurs under the direction of a "baron" process executing on each computer. Thus, for example, on computer 209, a first baron process 209*a* has spawned two sector managers 209*c* and 209*d*, one of which implements sector 2 (e.g., a "submarine" room) and another of which implements sector 7 (e.g., a "central fountain" room). Each sector manager is a software entity which allows players who have entered the sector to perform various activities and to exit the room. When all players have exited a sector, the sector manager can be extinguished to conserve computing resources. It will be appreciated that rather than actually spawning new processes on the computer, each baron could instead merely schedule a dormant process allocated in advance and this arrangement should also be interpreted as a "spawning" of a process.

Baron 209*a* receives CPU utilization information from a utilization process 209*b* which periodically averages the loading rate for the physical computer (e.g., every 20 seconds). Other computer loading statistics such as I/O rates, memory utilization and the like can also be used. Each baron such as baron 209*a* also periodically reports the computer loading information to primary controller 206*d* which uses this reported information to determine which computer is least heavily loaded.

In various aspects of the invention, newly scheduled sector managers are allocated across physical computers by the primary controller process 206*d* in a manner which generally balances the loading among computers and avoids a single point of failure.

Figure 3:
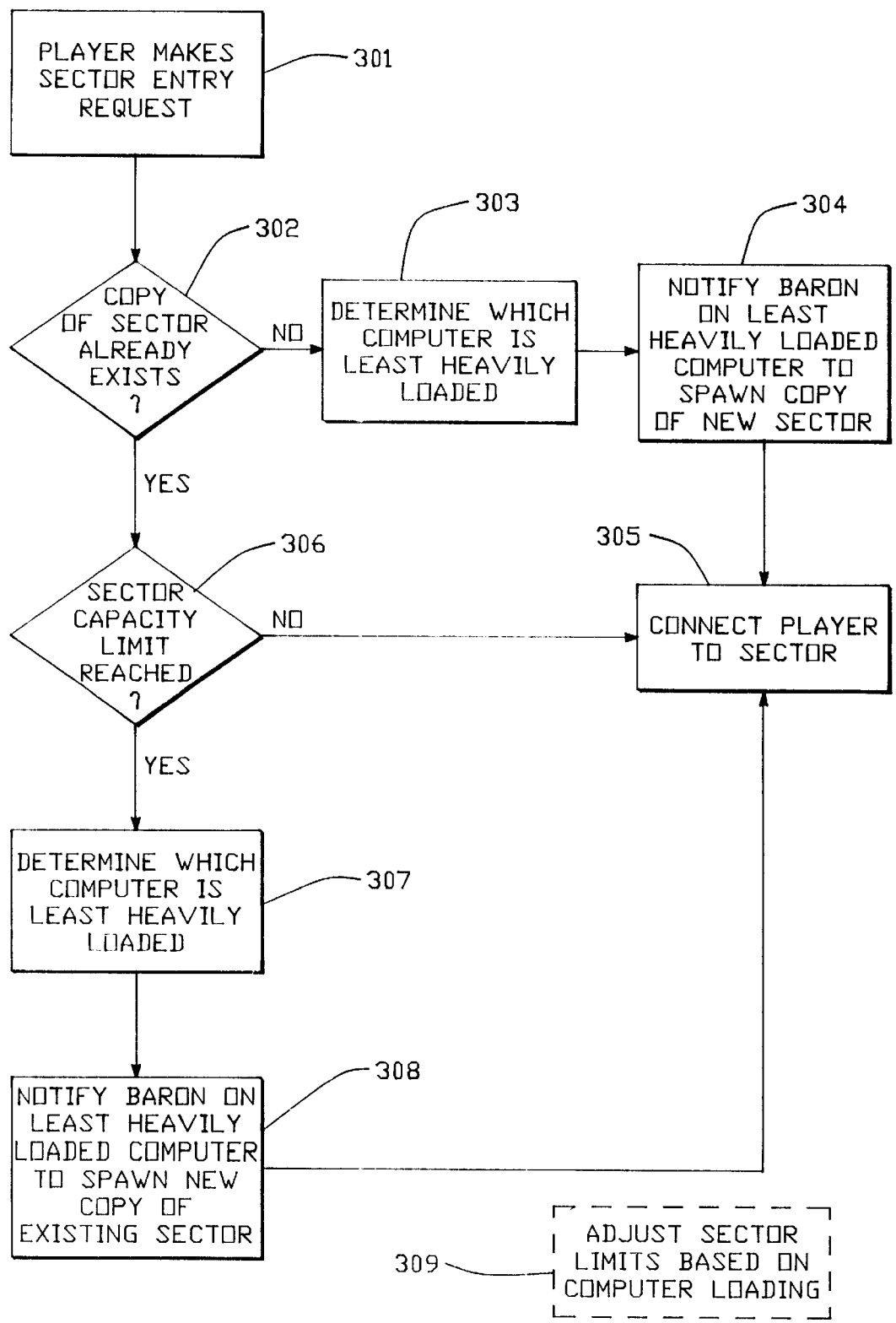
FIG. 3 is a flow chart illustrating various steps which may be performed in accordance with the invention.

Referring now to FIG. 3, a flow chart is provided illustrating steps performed by primary controller 206*d* to perform such a balanced allocation. Beginning in step 301, a player makes a sector entry request via one of the client game components 201*a* through 204*a*. For example, a new player entering a game after logging on through login server 206*c* will typically select a sector into which he will be performing various activities. A player who is already playing the game may move from one sector to another and thus also generate a sector entry request. In either event, in step 302 a check is made to determine whether a copy of the requested sector already exists on one of the machines 206 through 209. If a copy of the sector does not yet exist, then in step 303 a determination is made as to which computer is least heavily loaded. This can be performed in primary controller 206*d* by periodically receiving computer loading statistics from each baron (elements 207*a*, 208*a* and 209*a*) which obtain the statistics from a corresponding utilization function 207*b*, 208*b* and 209*b*.

In various embodiments, a baron process can be located on computer 206 although some accommodation should ideally be made to account for the expected loading associated with login server 206*c* and primary controller 206*d* (a similar accommodation should be made for keep server 207*c* on computer 207). To this end, a modified utilization process 206*b* and 207*b* can be provided which always reports a minimum "pegged" utilization rate (e.g., 20%) below which utilization will never be reported. Such a mechanism ensures that computer 206 and 207, which as depicted in FIG. 2 host additional processes such as the login server, will not be selected as the least heavily loaded computer until the other computers in the system reach the "pegged" utilization rate.

Referring again to FIG. 3, in step 303 the least heavily loaded computer is determined and, in step 304, the baron process on the least heavily loaded computer is notified to spawn a copy of the new sector. Thereafter, in step 305, the player is connected to the newly spawned sector.

If, in step 302, a copy of the requested sector already exists, then in step 306 a test is performed to determine whether the capacity limit for that sector has been exceeded. For example, in the "submarine" sector, a maximum of 4 persons may occupy the sector at a time. If in step 306 the capacity limit has not been exceeded, then in step 305 the player is connected to the existing sector.

If, in step 306, the sector capacity limit has been exceeded, then in step 307 the primary controller process determines which computer is least heavily loaded using the aforementioned techniques. Thereafter, in step 308, the baron process on the least heavily loaded computer is notified to spawn a new copy of the existing sector and in step 305 the player is connected to the new copy.

The maximum number of players which can reside in a particular sector can be defined as either a fixed number or as a function of various parameters such as computer loading. Thus, for example, if a particular computer in the system becomes heavily loaded, the sector limit for each sector on that computer can be dynamically adjusted downwardly to prevent the computer from becoming overloaded. If a particular sector normally permits up to 30 players in that sector, but the computer on which the sector is implemented is heavily loaded, the normal sector limit can thus be overridden to a lower value, forcing a new copy of the sector to be created on a less heavily loaded machine even before the 30-player limit is reached. This type of dynamic balancing permits more efficient machine utilization in the system. This adjustment is illustrated as an optional step 309 in FIG. 3 and can be performed at any time.

Based on the type of game, it may be preferable to attempt to group as many players as possible into a given room so that they can interact with each other (i.e., it may be undesirable to allocate two players to two different identical rooms on different computers, because then the players could not interact with each other).

Figure 4:
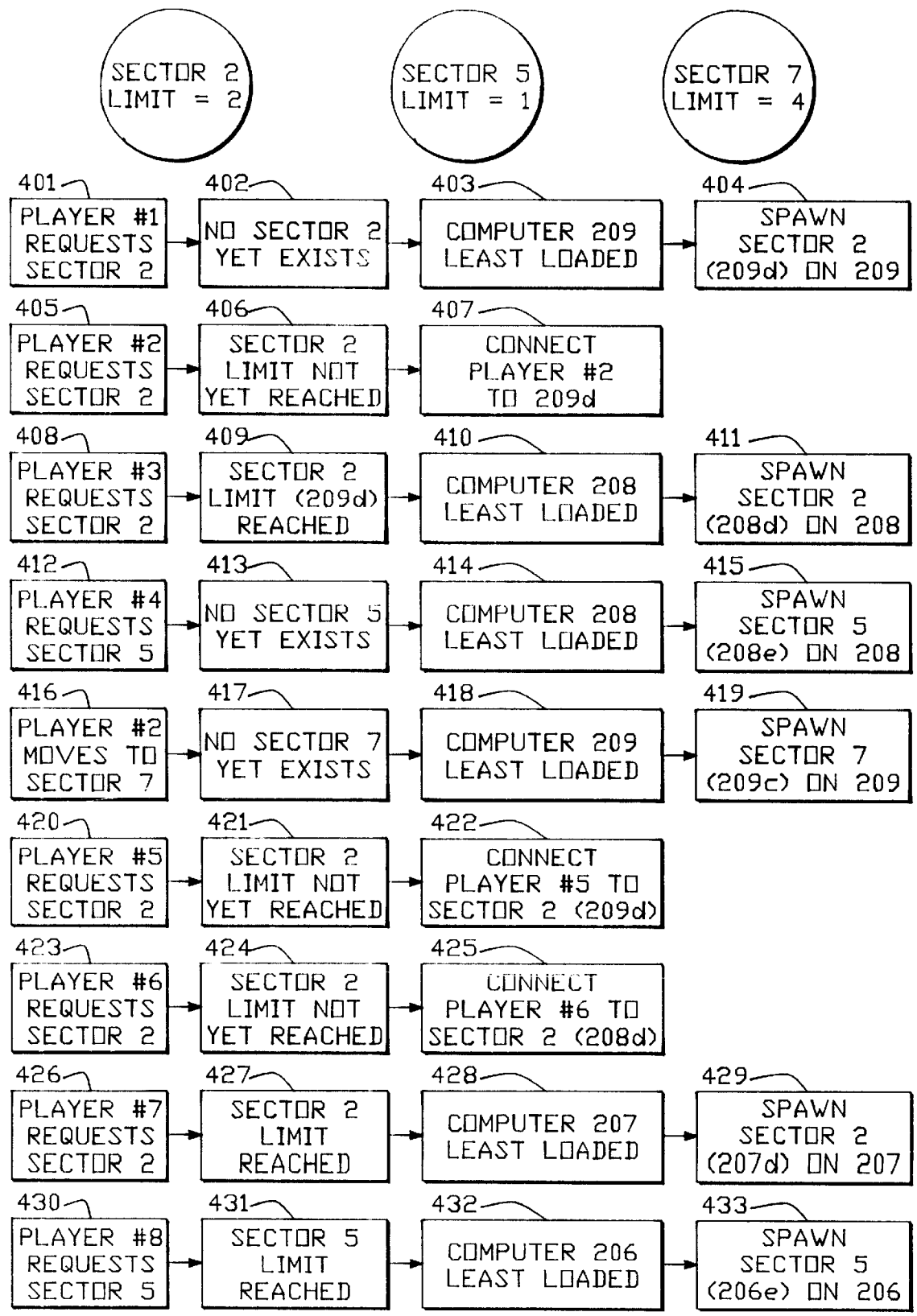
FIG. 4 shows a detailed example of allocating sector managers across physical computers based on computer loading and sector limits.
Figure 5:
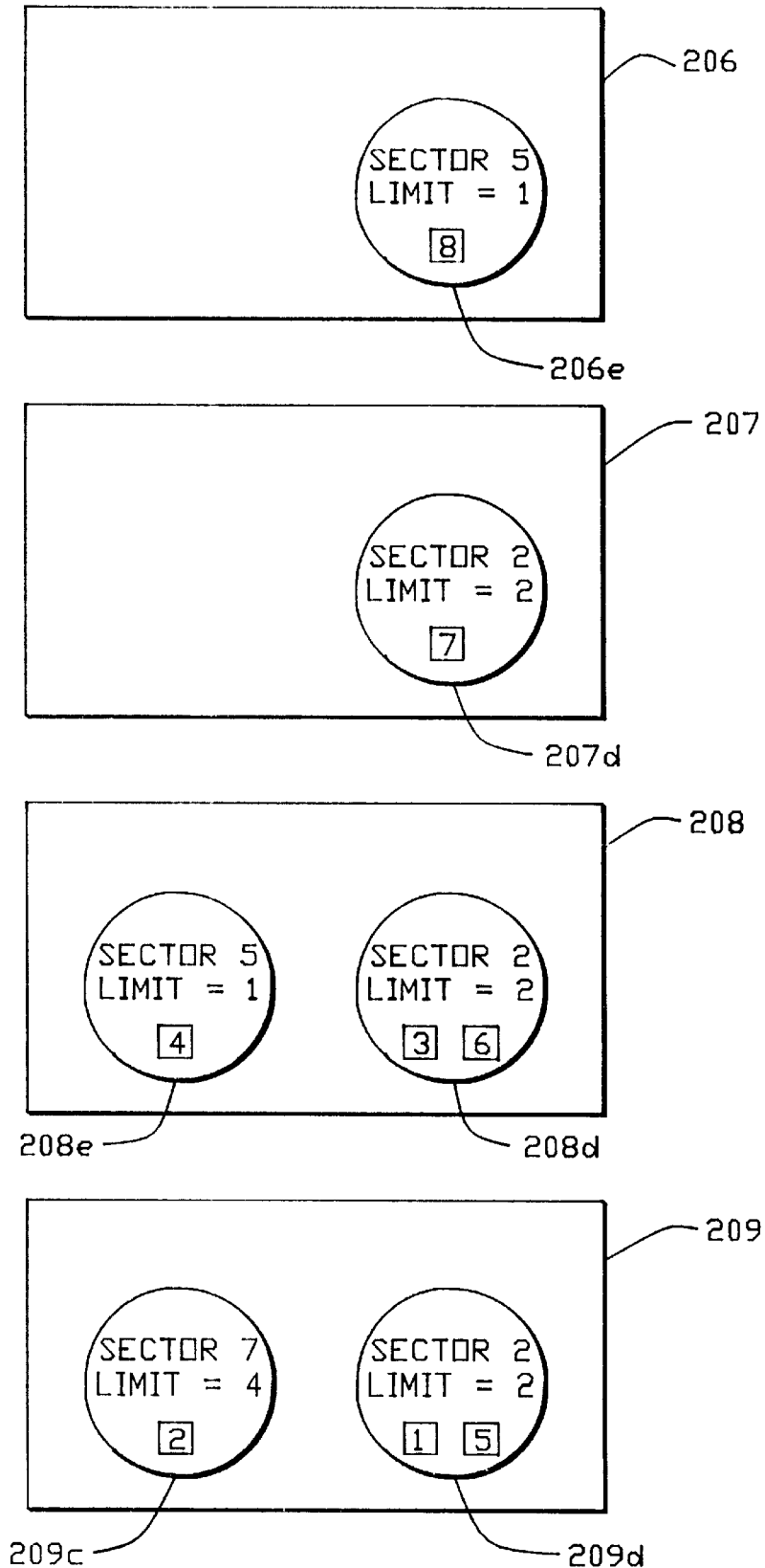
FIG. 5 shows the result of the allocations performed in FIG. 4.

Reference will now be made to FIGS. 4 and 5 which collectively illustrate by way of example a process of allocating sector manager processes across physical computers in accordance with various aspects of the invention. FIG. 4 shows steps performed in sequence as new players enter the game and existing players move between sectors. FIG. 5 shows the results of the steps in FIG. 4 and corresponds in most respects to the software structures shown in FIG. 2, augmented to illustrate which players are in each sector.

Assume for the purposes of discussion that a given multi-player computer game includes a number of different sectors including a sector 2 (having a two-player limit), a sector 5 (having a one-player limit) and a sector 7 (having a four-player limit). Referring to step 401 in FIG. 4, the first player (PLAYER #1) requests entry into a given sector, such as sector 2. (If PLAYER #1 had previously played the game and was able to successfully navigate through sector 1 (not shown), his next logical entry point for the game would thus be sector 2.) In step 402, the primary controller process determines that no copy of sector 2 yet exists in the system, so in step 403 it is determined that computer 209 is the least loaded computer in the system. Thereafter, in step 404 a copy of sector 2 (e.g., sector manager 209d) is spawned on computer 209, and PLAYER #1 enters that copy of sector 2. This is also illustrated in FIG. 5, in which players are indicated as squares residing within particular sector managers. Thus, PLAYER #1 resides in sector manager 209d in FIG. 5.

In step 405, assume that PLAYER #2 also requests entry into sector 2. In step 406, it is determined that the sector limit for the existing copy of sector 2 (i.e., sector manager 209d) has not yet been reached. Therefore, in step 407, PLAYER #2 is also connected to sector manager 209d.

In step 408, assume that PLAYER #3 also requests entry into sector 2. In step 409, a determination is made that the sector limit for sector 2 has already been reached with respect to sector manager 209d. Then, in step 410, it is determined that computer 208 is the least loaded computer and, thereafter, in step 411, another copy of sector 2 (e.g., sector manager 208d) is spawned on computer 208.

In step 412, PLAYER #4 requests entry into sector 5. In step 413, it is determined that no copy of sector 5 yet exists, and in step 414 it is determined that computer 208 is still the least loaded computer. (Note that because computers 206 and 207 preferably report "inflated" CPU utilization values to compensate for the administrative burden of running login server 206c, primary controller 206d, and keep server 207c, it is unlikely that computers 206 or 207 would be selected until the other computers in the system reach a threshold loading level). In step 415, a copy of sector 5 (i.e., sector manager 208e) is spawned on computer 208. This is also illustrated in FIG. 5 by a rectangle in sector 5 containing PLAYER #4.

In step 416, it is assumed that PLAYER #2 moves to sector 7, possibly by successfully completing various activities in sector 2. No copy of sector 7 is determined to exist (step 417). In step 418, it is determined that computer 209 is the least loaded computer. Thereafter, in step 419, a copy of sector 7 (e.g., sector manager 209c) is spawned on computer 209, and PLAYER #2 moves into that sector, thus leaving open an available position in sector 2 (sector manager 209d).

In step 420, suppose that PLAYER #5 requests entry into sector 2. In step 421, it is determined that the sector 2 limit is not yet reached because—due to the movement of PLAYER #2 out of sector manager 209d—an available space remains. Therefore, in step 422, PLAYER #5 is connected to sector 2 (i.e., sector manager 209d in computer 209).

In step 423, PLAYER #6 requests entry into sector 2. In step 424, it is determined that the sector 2 limit has still not been reached. Therefore, in step 425, PLAYER #6 is connected to sector 2 (specifically, sector manager 208d in computer 208 since the limit concerning sector manager 209d has been reached). At this point, both copies of sector 2 are full.

In step 426, PLAYER #7 requests entry into sector 2. In step 427, it is determined that the sector limit for sector 2 has been reached, and in step 428 a determination is made that computer 207 is now the least loaded computer. Thereafter, in step 429 another copy of sector 2 (i.e., sector manager 207d) is spawned on computer 207. This is illustrated in FIG. 5 by a rectangle with PLAYER #7 residing in sector manager 207d.

In step 430, PLAYER #8 requests entry into sector 5. In step 431, it is determined that the sector 5 limit has been reached, and thus in step 432 a determination is made that computer 206 is now the least loaded computer. Thereafter, in step 433 another copy of sector 5 (i.e., sector manager 206e) is spawned on computer 206 (see FIG. 5).

If one of the computers in the network crashes or otherwise becomes unavailable, the primary controller process can detect this condition and updates a table to avoid implementing new sectors on that machine. After the machine reboots, it contacts the primary controller process to make its availability known. Client game components associated with each player can detect that a particular computer is not responding (i.e., the corresponding sector manager fails to respond) and allow the player to move into a different sector (which will occur on a different computer after the primary controller process notices that the computer is not responding).

The above detailed example illustrates how sector manager processes can be allocated across distributed computers in order to balance loading among processors and eliminate single points of failure. It will be recognized that the login server 206c, primary controller 206d, keep server 207c, and each baron can be implemented in any of various programming languages and a source code or executable version of the same stored on a storage medium such as a CD-ROM, magnetic disk or the like. Accordingly, the scope of the invention includes a storage medium containing any or all of the functions described above.

It is apparent that many modifications and variations of the present invention are possible, and references to specific values are by example only. For example, although the term "process" has been used throughout the specification to refer generally to a computer program entity which is separately recognized and capable of being scheduled by an operating system on one of the computers, different functions (and thus processes) can of course be combined into a single process on the same computer, and the term "process" thus should be construed broadly to include any software entity (whether a "process" in the operating system sense or not) which performs a specified operation on a single computer.

The term "baron process" as used throughout the specification and claims is merely descriptive and refers to any software entity executing on a particular computer which is capable of performing the indicated functions (e.g., spawning a process on the computer and reporting computer loading statistics to a primary controller process). In various embodiments, each baron process can be implemented as part of the operating system.

The term "spawn" as used in the appended claims should be interpreted to cover not only the scheduling of a computer process but also more generally the initiation of any computer function to carry out a desired result.

Reference numerals in the appended method claims identifying steps are for convenience only and are not intended to imply a necessary ordering of the steps. It is apparent that the method steps of the invention may be practiced in a different ordered sequence from that illustrated without departing from the scope of the invention. It is, therefore, to be understood that within the scope of the appended claims the invention may be practiced otherwise than as specifically described.

We claim:

1. A system for implementing a multi-player computer game comprising a plurality of sectors each sector defining a logical area into which players can enter and perform game-related activities, the system comprising:

a plurality of computers coupled via a network, the plurality of computers including:

a first computer that, upon receiving a request to implement a first sector of the plurality of sectors as part of the multi-player computer game, spawns a first sector manager process on the first computer that implements said first sector on the first computer;

a second computer that, upon receiving said request to implement said first sector as part of the multi-player computer game, spawns a second sector manager process on the second computer that implements said first sector on the second computer; and a primary controller process executing on a third computer and being in communication over the network with the first and second computers, said primary controller process, upon being notified that a player wishes to enter said first sector, makes a first determination, on the basis of computer loading information for the first and second computers, of which of the first and second computers should implement said first sector and, upon making the first determination, issues the request to the first computer to implement said first sector if the first computer has more favorable computer loading characteristics, or issues the request to the second computer to implement said first sector if the second computer has more favorable computer loading characteristics.

2. The system of claim 1, wherein the first computer comprises a first baron process that receives the request to implement said first sector on the first computer and spawns the first sector manager process on the first computer; and wherein the second computer comprises a second baron process that receives the request to implement said first sector on the second computer and spawns a second sector manager process on the second computer.

3. The system according to claim 1, wherein at least one of the plurality of computers is coupled to the Internet, and wherein the game-related activities performed by the players are conducted over the Internet.

4. The system according to claim 1, wherein the third computer, upon receiving a request from the primary controller process to implement said first sector as part of the multi-player computer game, spawns a third sector manager process on the third computer that implements said first sector on the third computer; and wherein the primary controller process, upon being notified that the player wishes to enter said first sector, makes on the basis of computer loading information for the third computer a second determination about whether the third computer has more favorable computer loading characteristics than the first and second computers and, if the third computer has more favorable computer loading characteristics than the first and second computers, issues a request to the third computer to implement said first sector on the third computer.

5. The system according to claim 4, wherein the second determination is made using an artificially inflated computer utilization value that takes into account anticipated loading attributable to the primary controller process on the third computer.

6. The system according to claim 1, further comprising a first CPU utilization process executing on the first computer and a second CPU utilization process executing on the second computer, the first and second CPU utilization processes producing a first and second CPU utilization rate, respectively, the first and second CPU utilization rates indicating processing load levels at the first and second computers, respectively, wherein the first and second computers obtain the first and second CPU utilization rates from the first and second utilization processes, respectively, and periodically report the first and second CPU utilization rates to the primary controller process; and wherein the primary controller process uses the periodically reported CPU utilization rates in determining which of the first and second computers has more favorable computer loading characteristics.

7. The system according to claim 1, further comprising a plurality of personal computers, each personal computer of the plurality of personal computers being associated with one of the players in the multi-player game and coupled to one of the plurality of computers in the network via the Internet, wherein each personal computer of the plurality of personal computers comprises a client portion of the multi-player computer game that communicates with a sector manager process executing on one of the plurality of computers in the network to carry out player game-related activities.

8. The system of claim 1, wherein each sector of the plurality of sectors has associated therewith a capacity limit defining a maximum number of players that can be accommodated within said each sector.

9. The system of claim 8, wherein each sector of the plurality of sectors has a type, and the capacity limit of each sector of the plurality of sectors is fixed based on the type of sector.

10. The system of claim 8, wherein the capacity limit of each sector of the plurality of sectors is dynamically adjusted based on a loading value of the first computer.

11. The system of claim 1, further comprising a keep server process executing on at least one computer of the plurality of computers that maintains player state information across game sessions.

12. A system for implementing a multi-player computer game comprising a plurality of sectors, each sector defining a logical area into which players can enter and perform game-related activities, the system comprising:

a plurality of computers coupled via a network;

a primary controller means residing on one computer of the plurality of computers for receiving a player-initiated request to enter a first sector of the plurality of sectors as part of the multi-player computer game;

means, responsive to receiving a request to implement said first sector, for spawning on a first computer of the plurality of computers a first process that implements said first sector on the first computer and, responsive to receiving the request to implement said first sector, for spawning on a second computer of the plurality of computers a second software process that implements said first sector on the second computer;

wherein the primary controller means, upon receiving the player-initiated response, determines on the basis of computer loading information for the first and second computers which of the first and second computers should implement said first sector and, upon making the determination, issues the request to implement said first sector on the first computer if the first computer has more favorable computer loading characteristics, and issues the request to implement said first sector on the second computer if the second computer has more favorable computer loading characteristics.

13. The system according to claim 12, wherein each sector of the plurality of sectors supports a maximum number of players, and wherein the primary controller means, in response to detecting that the maximum number of players for said first sector would be exceeded, requests that a new copy of said first sector be created on the computer having the most favorable computer loading characteristics.

14. The system according to claim 13, wherein the maximum number of players for each sector of the plurality of sectors is dynamically adjusted depending on computer loading information for the first computer.

15. A method of implementing a computer game comprising a plurality of game sectors, each game sector of said plurality of game sectors defining a logical area into which game players can enter and perform activities related to said logical area, the method comprising the steps of:

providing a plurality of computers, each computer of said plurality of computers being able to execute a sector manager that implements at least one copy of at least one game sector of the plurality of game sectors;

receiving in a first computer of the plurality of computers a request from a player to enter a first game sector of the plurality of game sectors;

making a determination of which computer of the plurality of computers has the most favorable computer loading characteristics; and executing said sector manager on said computer having the most favorable computer loading characteristics to implement a first copy of the first game sector.

16. The method of claim 15, further comprising the step of periodically reporting computer loading values to a process executing on one computer of the plurality of computers and using the periodically reported computer loading values in determining which computer of the plurality of computers should implement the first game sector.

17. The method of claim 15, further comprising the step of implementing, when a player limit has been reached for the first copy of the first game sector, a second copy of said first game sector on a computer different from said computer where said first copy was implemented.

18. The method of claim 15, further comprising the step of reporting an artificially inflated computer loading value on one computer of the plurality of computers to account for administrative processes executing on the one computer.

19. The method of claim 15, wherein step (4) comprises the step of identifying which computer of the plurality of computers has a lowest CPU utilization rate and using said lowest CPU utilization rate in the determination about which computer of the plurality of computers has the most favorable computer loading characteristics.

20. A method of implementing a distributed computer game comprising a plurality of game sectors, each game sector of said plurality of game sectors defining a logical area into which game players can enter and perform activities related to said logical area, the method of comprising the steps of:

providing a plurality of computers, each computer of said plurality of computers being able to spawn a plurality of sector managers, wherein each sector manager of the plurality of sector managers implements at least one copy of at least one game sector of the plurality of game sectors on said computer of said plurality of computers;

receiving in a first computer of the plurality of computers a request from a player to enter a first game sector of the plurality of game sectors;

making a determination about whether a copy of said first game sector already exists on any computer of the plurality of computers and, if a capacity limit has not yet been exceeded for said copy, allowing the player to enter said copy of said first game sector; and upon determining that said copy of said first game sector does not already exist on any computer of the plurality of computers, making an identification of which computer of the plurality of computers has the most favorable computer loading characteristics and, based on the identification, spawning said copy of said first game sector on said computer having the most favorable computer loading characteristics.

21. The method of claim 20, further comprising the step of, if said capacity limit has been exceeded, creating a second copy of said game sector on another of the plurality of computers that has favorable computer loading characteristics.

22. A computer readable storage medium comprising instructions that control a multi-player computer game, wherein the instructions, when executed on any networked computer of a plurality of networked computers, determine which networked computer of the plurality of networked computers has the most favorable computer loading characteristics and is therefore a most favorable computer, select said most favorable computer in response to receiving a player request to enter a game sector defining a logical area into which players can enter and perform game-related activities, and issue a spawning request to said most favorable computer to spawn a process that implements said game sector on said most favorable computer.

23. The computer readable storage medium of claim 22, wherein the instructions include a first baron process operable on a first networked computer of the plurality of networked computers to receive the spawning request and spawn the process on the first networked computer, and a second baron process operable on a second networked computer of the plurality of networked computers to receive the spawning request and spawn the process on the second networked computer.

* * * * *